Figure 1:
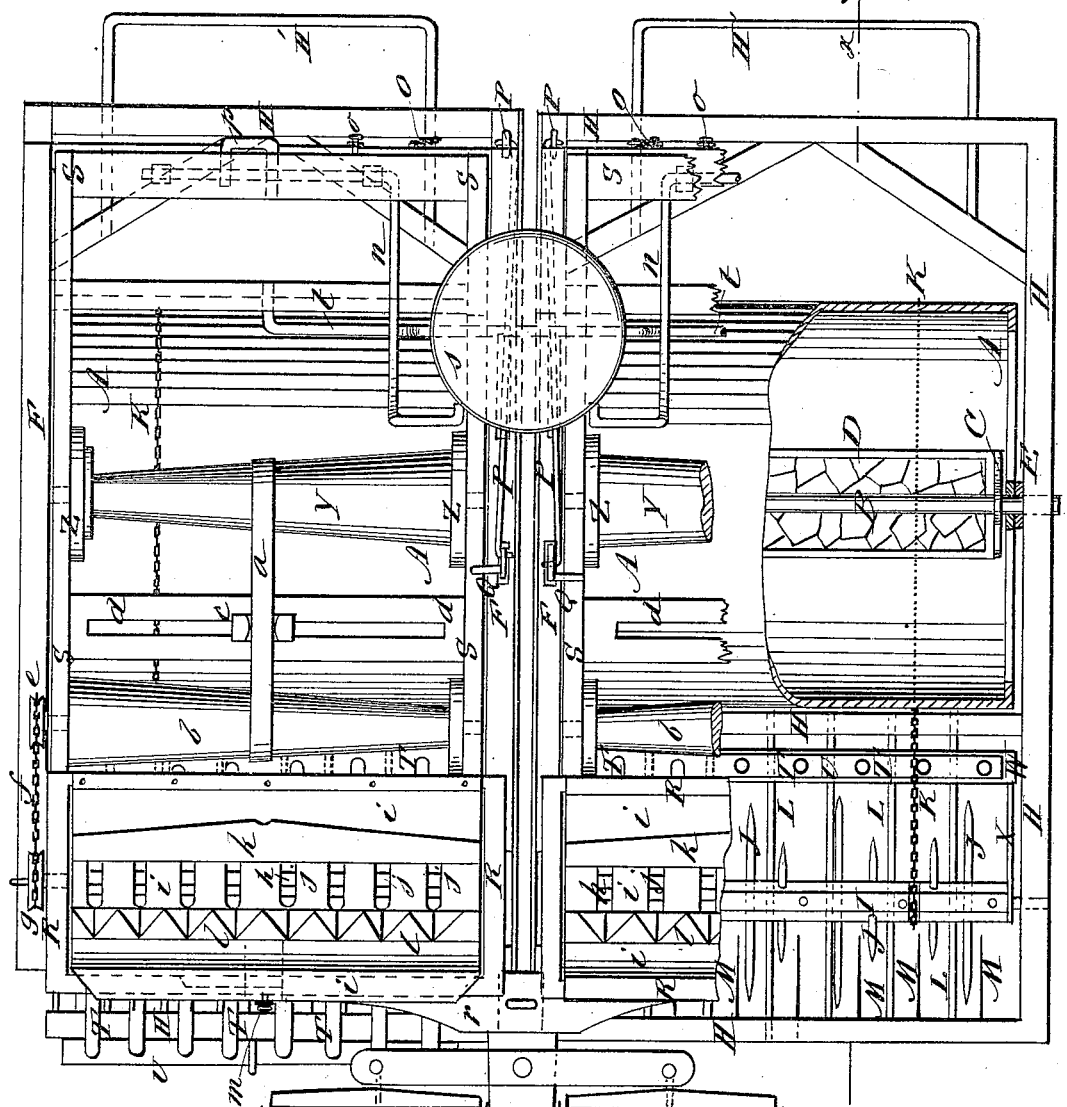

(Model.)

R. & J. B. LANG.
Combined Harrow, Seeder, and Roller.

No. 242,335. Patented May 31, 1881.

WITNESSES:
C. Neveux
C. Sedgwick

INVENTOR:
R. Lang
J. B. Lang
BY Munn & Co
ATTORNEYS.

(Model.)
2 Sheets—Sheet 2.
R. & J. B. LANG.
Combined Harrow, Seeder, and Roller.
No. 242,335. Patented May 31, 1881.
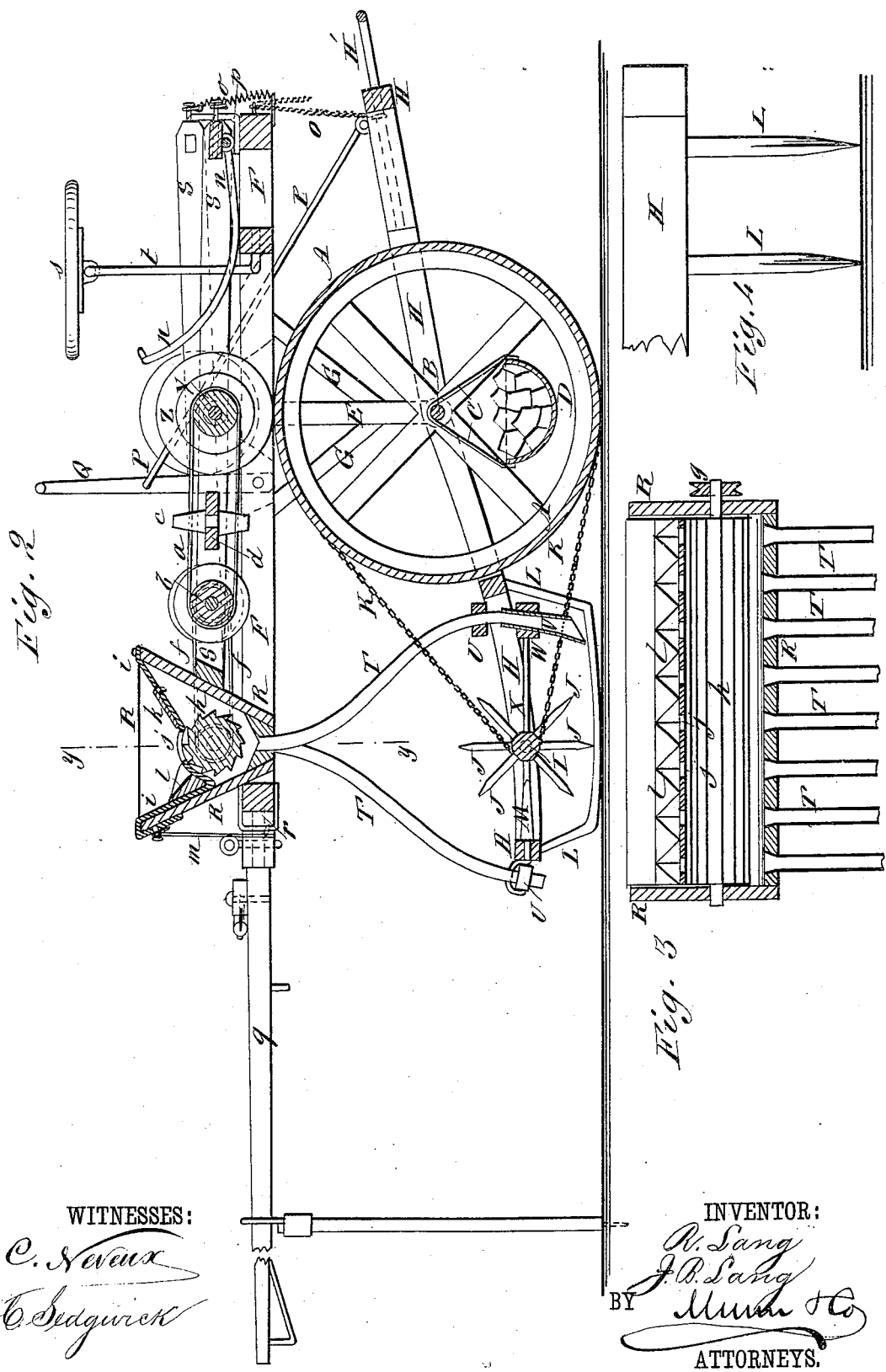

UNITED STATES PATENT OFFICE.

ROBERT LANG AND JAMES B. LANG, OF LINDSAY, ONTARIO, CANADA.

COMBINED HARROW, SEEDER, AND ROLLER.

SPECIFICATION forming part of Letters Patent No. 242,335, dated May 31, 1881.

Application filed February 21, 1881. (Model.)

*To all whom it may concern:*

Be it known that we, ROBERT LANG and JAMES BURTON LANG, of Lindsay, in the county of Victoria, Province of Ontario, Canada, have invented a new and useful Improvement in Combined Harrow, Seeder, and Roller, of which the following is a specification.

Figure 1, Sheet 1, is a plan view of our improvement, parts being broken away. Fig. 2, Sheet 2, is a sectional side elevation of the same, taken through the line *x x*, Fig. 1. Fig. 3, Sheet 2, is a sectional elevation of the seed-hopper, taken through the line *y y*, Fig. 2. Fig. 4, Sheet 2, is a front elevation of a part of the lower frame, showing two of the runners.

The object of this inventon is to till or mellow the soil, sow the seed, and smooth or roll the land at one operation.

Similar letters of reference indicate corresponding parts.

A represents a roller of any desired or convenient length and size, and of such a weight as will properly smooth the soil. The roller A revolves upon a shaft, B, from which is suspended, by U rods or bails C, a box, D, to receive stones or other heavy substances, so that the weight of the roller A can be regulated as the condition of the land may require. The ends of the shaft B are attached or pivoted to the lower ends of hangers E, the upper ends of which are attached to the side-bars of the frame F. The hangers E are strengthened in position by inclined braces G, attached to them and to the said frame F. The hangers E are made of such a length that the frame F will be a little above the top of the roller A. To the ends of the shaft B are also pivoted the side bars of the frame H.

To the forward parts of the side bars of the frame H are pivoted the journals of a shaft, I, to which are attached radial teeth J, to pulverize and mellow the soil. Around the shaft I, or a pulley attached to the said shaft, passes a chain or belt, K, which also passes around the roller A, so that the toothed shaft or rotary harrow I J will be driven from the said roller. The rotary harrow I J is made to pass over obstructions by runners L, the ends of which are attached to cross-bars of the frame H in front and rear of the said rotary harrow I J. The forward parts of the runners L are made sharp and thin, so that they will enter the ground easily, and thus allow the teeth J to operate. With this construction, should the runners L strike an obstruction they will slide over it, and thus guard the said teeth J and drill-teeth from being broken.

To the inner side of the front cross-bar of the frame H are attached rearwardly-projecting knives M in such positions that the teeth J of the rotary harrow will pass between them, so that any grass or weeds that may lodge upon and be carried up by the said harrow-teeth will be cut in pieces and the clogging of the harrow will be prevented.

To the rear end of the frame H is attached a handle, H', so that the rotary harrow I J can be raised from the ground from the rear of the machine.

To the rear part of the frame H is hinged the rear end of a rod, P, the forward end of which is hinged to a lever, Q. The lower end of the lever Q is hinged to the side bar of the frame F, and its upper end projects into such a position that it can be readily reached and operated by the driver with his hand to raise the rotary harrow I J from the ground.

R is the seed-hopper, which is attached to the forward end of the frame S, and rests between the forward cross-bars of the frame F.

In the bottom of the seed-hopper R are formed a number of holes for the discharge of the seed. With the discharge-holes in the bottom of the seed-hooper R are connected the upper ends of a corresponding number of flexible tubes, T, through which the seed passes to the ground, and which, near their lower ends, are attached to a bar or frame, U, to keep them in proper relative positions. The lower ends of the conductor-tubes T are inserted in the hollow shanks of the drill-teeth V, which are secured to a bar, W, placed in the rear of the rotary harrow I J, and connected with the journals of the said harrow I J by rods X, so that the seed will be deposited in channels opened in the soil mellowed by the said harrow. For broadcast sowing the tubes T are withdrawn from the drill-teeth V, and the lower parts of the said tubes and their connecting-bar U are placed in front of the forward cross-bar of the frame H, so that the seed will be covered by the harrow I J.

In bearings in the middle parts of the side bars of the frame S revolve the journals of the cone-pulley Y, which has wheels Z attached to or formed upon its ends. The faces of the wheels Z rest upon the face of the roller A, so that the cone-pulley Y will be revolved by the revolution of the said roller A. Around the cone-pulley Y passes a belt, $a$, which also passes around a corresponding cone-pulley, $b$, the journals of which revolve in bearings in the side bars of the frame S.

The cone-pulleys Y $b$ give motion to the seed-feeding mechanism, and the rapidity of the said motion is regulated by adjusting the belt $a$ upon the said cone-pulleys. The belt $a$ passes through the slotted ends of a short bar, $c$, which passes through a longitudinal slot in a cross-bar, $d$, attached to or forming a part of the frame S.

To one of the journals of the forward cone-pulley, $b$, is attached a small pulley, $e$, around which passes a belt or chain, $f$. The belt or chain $f$ also passes around a small pulley, $g$, attached to one of the journals of the cylinder $h$, which revolves in bearings in the ends of the seed-hopper R. The cylinder $h$ is grooved longitudinally with angular grooves, forming ratchet-teeth, as shown in Figs. 1, 2, and 3.

To the rear edge of the seed-hopper R is attached the edge of a sheet, apron, or plate, $i$, of rubber or other suitable flexible material, which rests upon the cylinder $h$, and its forward edge is drawn over the forward edge of the seed-hopper R and secured by hooks, pins, or other suitable fastenings. In the part of the flexible plate $i$ that rests upon the feed-cylinder $h$ are formed slots $j$, through which the seed passes to the said cylinder $h$, by the teeth of which it is carried over and discharged upon the perforated bottom of the said seed hopper to pass through the conductor-tubes to the ground. The size of the slots $j$ can be adjusted to regulate the amount of seed sown by a plate, $k$, of sheet metal or other suitable materal, secured to the flexible plate $i$.

When it is desired to place the drills at such a distance apart that the rows of plants can be cultivated the plate $k$ has slots cut in it at the desired distance apart, and is placed over the slotted part of the apron $i$, so that the seed will be fed only to the proper conductor-tubes, T.

To the flexible plate $i$, at the lower ends of the slots $j$, is attached a bar, $l$, which has notches formed in it, corresponding in position and number with the slots $j$, to guide the seed into the said slots.

The seed-hopper R and the forward end of the frame S are held from rising by a hook, $m$, hinged to the front cross-bar of the frame F and hooking into a staple or other keeper, or upon a pin attached to the forward part of the seed-hopper R. The rear end of the frame S is raised to raise the wheels Z of the cone-pulley Y off the roller A, and thus stop the operation of the seed-dropping mechanism by a lever, $n$, connected with the rear cross-bar of the frame S and fulcrumed upon a cross-bar of the frame F. The rear end of the frame S is held down, holding the wheels Z pressed against the roller A, by a rubber or other spring, $o$, attached to the rear cross-bars of the frames S F. The rear end of the frame S is held in place, when raised, holding the wheels Z away from the roller A by a link or U-bar, $p$, hinged to the rear cross-bar of the frame S, and resting upon the rear cross-bar of the frame F, the said link or bar thus acting as a pawl.

In using the machine it is designed to place two machines, constructed as hereinbefore described, side by side, so that they can adjust themselves to uneven ground. In this case the tongue $q$, to which the draft is applied, and by means of which the machine is guided, is attached to the center of a cross-bar, $r$. The ends of the cross-bar $r$ are secured to the front cross-bars of the two frames F.

$s$ is the driver's seat, which is attached to the upper ends of two standards, $t$, the lower parts of which are bent outward at right angles, or nearly at right angles, and their ends are hinged to cross-bars of the two frames F at their mid-length, so that the driver's weight is equally distributed, and the seat will keep a horizontal position when the two machines are passing over uneven ground.

When a single machine is to be used the tongue $q$ and driver's seat $s$ are connected with the frame F of that machine.

Having thus fully described our invention, we claim as new and desire to secure by Letters Patent—

1. The combination, with the rotary harrow I J, of the runners L, attached at their front and rear ends to pivoted frame H, the forward parts of the runners being made sharp and thin to enter the ground and allow the harrow-teeth to operate, as described.

2. In a combined harrow, seeder, and roller, the combination, with the hinged frame H and the rotary harrow I J, of the bar W, carrying the drill-teeth V, and the draw-rods X, substantially as herein shown and described, whereby the seed will be deposited in soil mellowed by the harrow, as set forth.

3. In a combined harrow, seeder, and roller, the combination, with the roller A, the top frame, S, and the seed-hopper R, of the friction-wheels Z, the cone-pulleys and band Y $b$ $a$, the pulleys and band $e$ $g$ $f$, the grooved seed-dropping cylinder $h$, and the slotted apron $i$, substantially as herein shown and described, whereby the seed is taken from the seed-hopper and discharged into the conductor-tubes by the advance of the roller, as set forth.

ROBERT LANG.
JAMES BURTON LANG.

Witnesses:
EMMA LANG,
E. S. FIDLER.